(12) United States Patent
Lafon et al.

(10) Patent No.: US 9,718,554 B2
(45) Date of Patent: Aug. 1, 2017

(54) WINDOW MOUNTED RAFT SYSTEM

(71) Applicants: Brian D. Lafon, Johnson City, TN (US); Robert G. Capwell, Blountville, TN (US)

(72) Inventors: Brian D. Lafon, Johnson City, TN (US); Robert G. Capwell, Blountville, TN (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 15/000,760

(22) Filed: Jan. 19, 2016

(65) Prior Publication Data

US 2016/0130007 A1    May 12, 2016

Related U.S. Application Data

(63) Continuation of application No. 13/359,584, filed on Jan. 27, 2012, now Pat. No. 9,238,508.

(60) Provisional application No. 61/438,859, filed on Feb. 2, 2011.

(51) Int. Cl.
| | | |
|---|---|---|
| *B64C 1/12* | (2006.01) | |
| *B64D 25/16* | (2006.01) | |
| *B64C 1/14* | (2006.01) | |
| *B63C 9/04* | (2006.01) | |

(52) U.S. Cl.
CPC ............. *B64D 25/16* (2013.01); *B63C 9/04* (2013.01); *B64C 1/1484* (2013.01); *B63C 2009/042* (2013.01)

(58) Field of Classification Search
CPC .......... B64D 25/12; B64D 25/14; B64D 25/18
See application file for complete search history.

(56) References Cited

U.S. PATENT DOCUMENTS

| | | | |
|---|---|---|---|
| 2,475,978 A | 7/1949 | Mill | |
| 3,465,991 A | 9/1969 | Banas et al. | |
| 3,771,749 A * | 11/1973 | Smialowicz | ........... B64D 25/14 |
| | | | 182/48 |
| 5,102,070 A * | 4/1992 | Smialowicz | ........... B64D 25/14 |
| | | | 182/48 |
| 6,341,748 B1 | 1/2002 | Brooks et al. | |
| 7,329,164 B2 * | 2/2008 | Bermal | ................. B64C 1/1415 |
| | | | 292/144 |
| 2006/0175866 A1 | 8/2006 | Dankert et al. | |
| 2007/0199188 A1 | 8/2007 | Barker | |

OTHER PUBLICATIONS

Office Action dated Feb. 28, 2014 from related counterpart CA App. No. 2,766,625.
Extended European Search Report dated Apr. 16, 2012 from related counterpart EP App. No. 12153729.4.
Non-final Office Action dated Feb. 28, 2014 from related U.S. Appl. No. 13/359,584.

(Continued)

*Primary Examiner* — Brian M O'Hara
(74) *Attorney, Agent, or Firm* — James E. Walton

(57) ABSTRACT

An inflatable life raft system for an aircraft includes a window coupled to a fuselage portion of the aircraft. A mechanism is used to selectively detach the window from the fuselage. An inflatable life raft is deployable to the exterior of the aircraft upon detachment of the window from the aircraft.

8 Claims, 9 Drawing Sheets

(56) References Cited

OTHER PUBLICATIONS

Amendment dated Oct. 28, 2014 from related U.S. Appl. No. 13/359,584.
Final Office Action dated Jan. 29, 2015 from related U.S. Appl. No. 13/359,584.
Amendment dated Mar. 30, 2015 from related U.S. Appl. No. 13/359,584.
Advisory Action dated Apr. 27, 2015 from related U.S. Appl. No. 13/359,584.
Request for Continued Examination dated Apr. 29, 2015 from related U.S. Appl. No. 13/359,584.
Non-final Office Action dated May 26, 2015 from related U.S. Appl. No. 13/359,584.
Amendment dated Aug. 26, 2015 from related U.S. Appl. No. 13/359,584.
Notice of Allowance dated Sep. 9, 2015 from related U.S. Appl. No. 13/359,584.

* cited by examiner

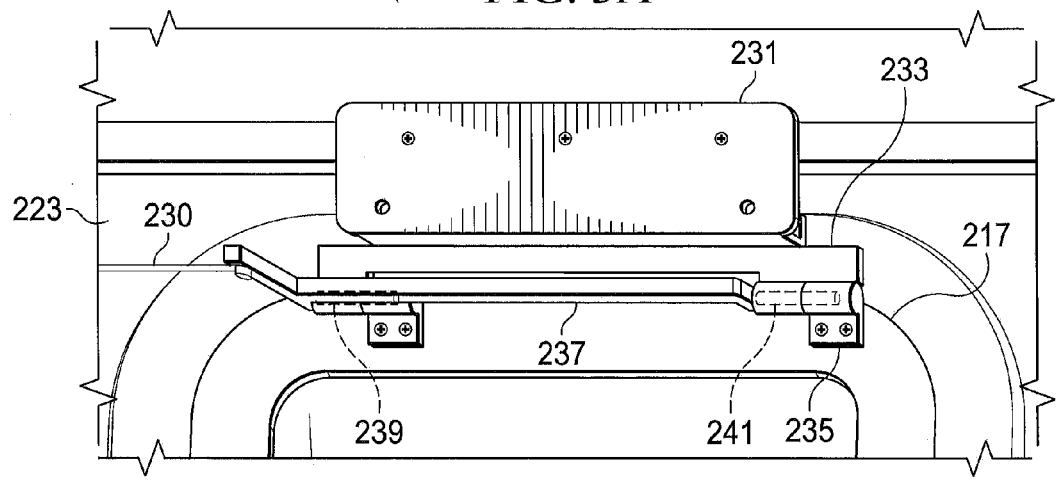
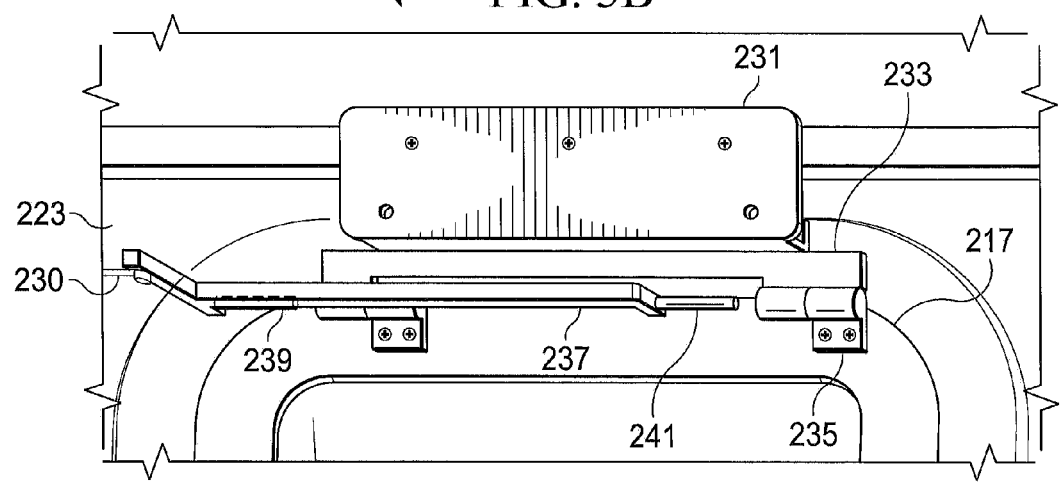

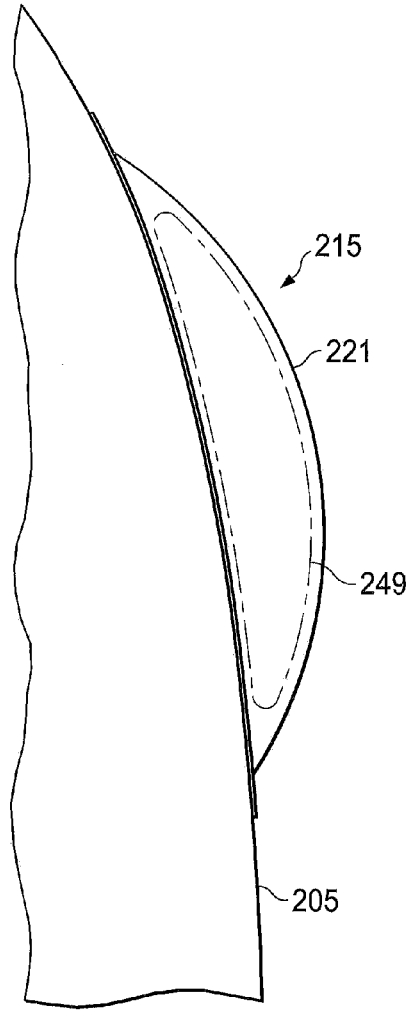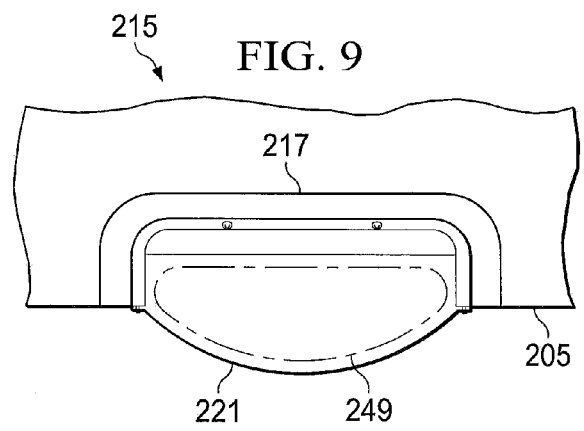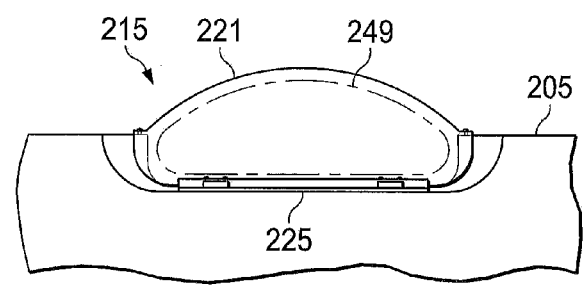
FIG. 8
FIG. 9
FIG. 10

WINDOW MOUNTED RAFT SYSTEM

This is a continuation of prior application Ser. No. 13/359,584, filed 27 Jan. 2012, titled "Window Mounted Raft System," which is hereby incorporated herein by reference, and which claims the benefit of U.S. Provisional Application No. 61/438,859, filed 2 Feb. 2011, which is also hereby incorporated herein by reference.

BACKGROUND

Technical Field

The present application relates to a window mounted raft system for an aircraft.

Description of Related Art

Aircraft that frequently fly over large bodies of water may be outfitted with flotation systems to be used in an emergency landing in the body of water. Referring to FIG. 1, a rotorcraft 101 is outfitted with a plurality of inflatable flotation bags located under the rotorcraft. These flotation bags are configured to keep the rotorcraft afloat upon an emergency ditch of the aircraft into the body of water. Furthermore, an inflatable life raft may be packaged with one of the flotation bags, such as raft/flotation package 103. The inflatable life raft is configured to provide flotation for the occupants of the rotorcraft. Packaging the life raft with one of the flotation bags causes the size of package 103 to cause an undesirable aerodynamic drag upon the rotorcraft. Furthermore, the size and location of the life raft/flotation package 103 encumbers the ingress/egress of passengers to/from the rotorcraft. As such, raft/flotation package 103 is susceptible to damage from being in a high traffic area of aircraft occupants. Furthermore, it is sometimes desirable for a rotorcraft operator to selectively remove the life raft from the rotorcraft. As such, packaging the life raft with the flotation bag prevents the removal of the life raft without also removing the flotation bag. Furthermore, packaging the life raft with the flotation bag typically requires a supplemental external compressed air bottle, as well as supplemental plumbing between the life raft and the supplemental bottle. Furthermore, packaging the life raft with the flotation bag keeps the rotorcraft pilot or crew from being able to control deployment and operation of the life raft.

Hence, there is a need for an improved life raft system for an aircraft.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

FIG. 5A is a partial interior partial perspective view of the window mounted raft system, according to the illustrative embodiment of the present application;

FIG. 5B is a partial interior partial perspective view of the window mounted raft system, according to the illustrative embodiment of the present application;

FIG. 8 is a side view of the window mounted raft system, according to the illustrative embodiment of the present application;

FIG. 9 is a top view of the window mounted raft system, according to the illustrated embodiment of the present application;

FIG. 10 is a bottom view of the window mounted raft system, according to the illustrated embodiment of the present application;

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
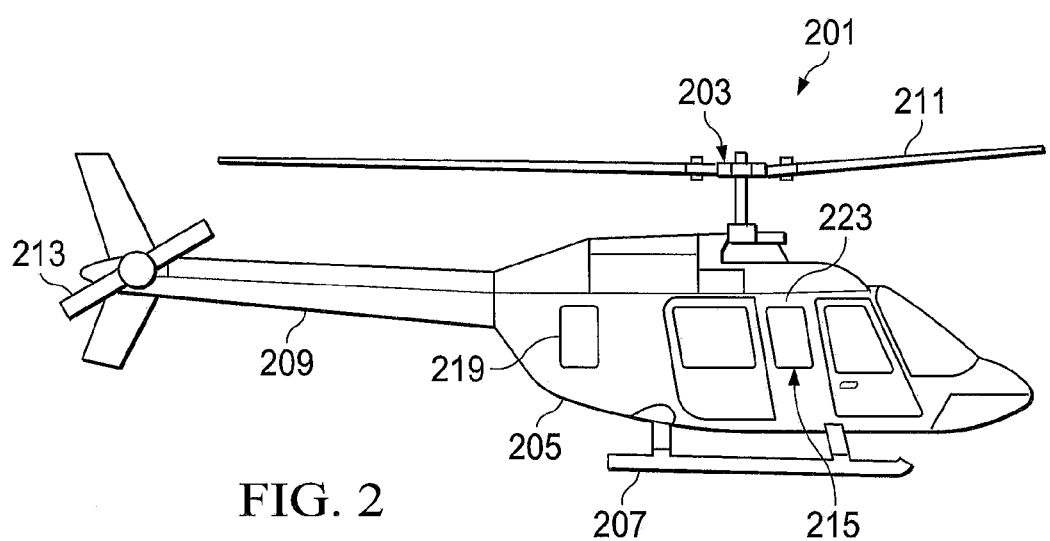
FIG. 2 is a side view of a rotorcraft, according to an illustrative embodiment of the present application.

Referring to FIG. 2 in the drawings, a rotorcraft 201 is illustrated. Rotorcraft 201 has a rotor system 203 with a plurality of main rotor blades 211. Rotorcraft 201 further includes a fuselage 205, landing gear 207, a tail member 209, and tail rotor blades 213. The pitch of each main rotor blade 211 can be selectively controlled in order to selectively control direction, thrust, and lift of rotorcraft 201. Further, the pitch of tail rotor blades 213 can be selectively controlled in order to selectively control yaw of rotorcraft 201. The configuration of rotorcraft 201 is illustrated for exemplary purposes. Further, it should be appreciated that the exact configuration of rotorcraft 201 is implementation specific. For example, rotorcraft 201 is not limited to having landing gear 207 with a skid gear variety; rather rotorcraft 201 may have any variety of landing gear shapes and types, such as a wheel gear type. It should be appreciated that the system of the present application may be incorporated onto aircraft other than rotorcraft 201.

Rotorcraft 201 further includes a raft system 215 mounted to a portion of fuselage 205. In the preferred embodiment, raft system 215 is mounted and located in a fuselage frame 223 that is configured for the mounting of a conventional fixed window frame thereto; however, in alternative embodiments raft system 215 can be mounted to other fuselage structures. For example, raft system 215 can be adapted for mounting in a fuselage frame 219 that is configured for the mounting of a conventional panel thereto, as discussed further herein with regard to FIG. 12.

Referring now also to FIGS. 3-11, raft system 215 is preferably coupled to fuselage frame 223, which in the illustrated embodiment is aft of the pilot's seat on the right side of rotorcraft 201. It should be appreciated that raft system 215 may be located in a variety of window frame geometries and locations. The location and size of raft system 215 is implementation specific according to the specific configuration of the aircraft for which the raft system 215 is installed. Further, raft system 215 may be located in multiple locations on rotorcraft 201. Even further, raft system 215 may be incorporated onto aircraft other than rotorcraft 201.

Figure 3:
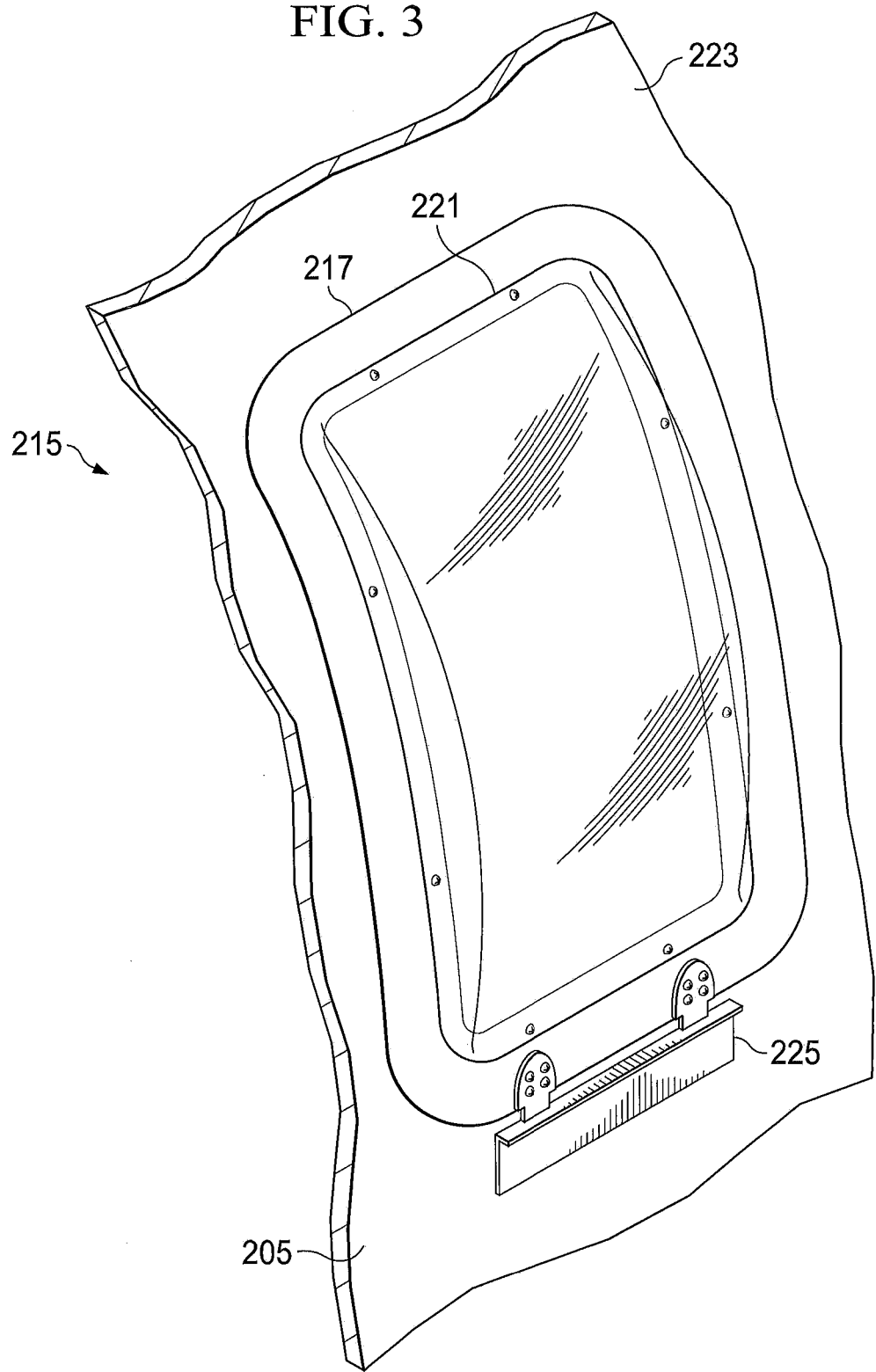
FIG. 3 is an exterior perspective view of a window mounted raft system, according to an illustrative embodiment of the present application.

Referring to FIG. 3, an exterior perspective view of raft system 215 is illustrated. Raft system 215 includes a window 221 coupled to window frame 217. In the preferred embodiment, window 221 has a bulged contour to provide space for internal components of raft system 215, such as an inflatable life raft 249; however, it should be appreciated an alternative embodiment of window 221 can have a non-bulged contour similar to the outer contour of rotorcraft 201. Window frame 217 is releasably coupled to fuselage frame 223 of the fuselage 205 with a hinge 225. A pin mechanism 227 (shown best in FIGS. 4, 5A, and 5B) allows window frame 217 to be released from its latched position. Upon release at pin mechanism 227, window frame 217 opens by rotating about an axis defined by hinge 225. Window frame 217 automatically disengages from hinge 225 after outwardly rotating on hinge 225 to a prescribed degree, thus facilitating separation of window frame 217 and window 221 from fuselage 205.

Figure 4:
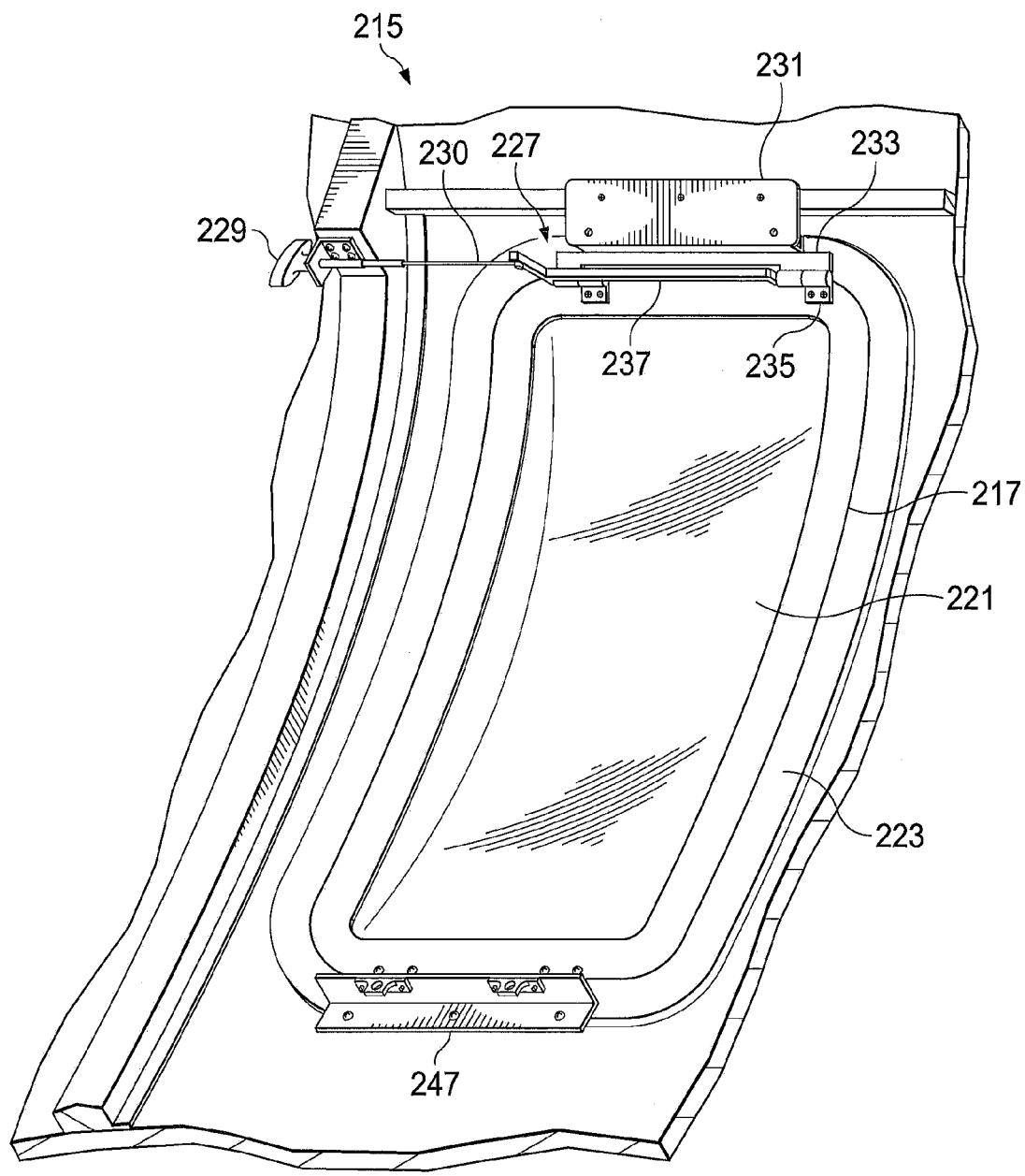
FIG. 4 is a partial interior perspective view of the window mounted raft system, according to the illustrative embodiment of the present application.

Referring to now also to FIG. 4, an interior partial perspective view of raft system 215 is illustrated. A pin mechanism 227 is operably associated with a handle 229, via a cable 230. Handle 229 is ergonomically located so that the pilot can manually pull handle 229, thus releasing window frame 217 resulting in deployment of inflatable life raft 249, as discussed further herein. Handle 229 is also located so that other rotorcraft occupants, such as passengers and/or crew members, can access handle 229 and thus deploy inflatable life raft 249 of raft system 215. It should be appreciated that an alternative embodiment of raft system 215 can include an actuator for mechanically releasing window frame 217. For example, the pilot can deploy the life raft by selecting a button or switch on the flight instrument panel. Further, the life raft may be deployed automatically by communication between the actuator and a sensor device, such as an emersion sensor, that detects a crash of rotorcraft 201 into water.

Referring now also to FIGS. 5A and 5B, pin mechanism 227 is illustrated in further detail. Pin mechanism 227 includes an arm 237 having a forward pin 239 and an aft pin 241. A keeper 235 is rigidly attached to window frame 217. An upper latch bracket 233 is attached to fuselage structure via an adapter 231. FIG. 5A illustrates pin mechanism 227 in the latched position, such that forward pin 239 and aft pin 241 each penetrate openings in upper latch bracket 233 and keeper 235, so as to secure window frame 217 to fuselage frame 223. FIG. 5B illustrates pin mechanism 227 in the unlatched position, such that forward pin 239 and aft pin 241 are removed from openings in upper latch bracket 233 and keeper 235, so that window frame 217 is free to rotate on hinge 225 (shown at least in FIG. 3) and release itself from fuselage frame 223. It should fully be appreciated that pin mechanism 227 is illustrated as one of a variety of mechanisms that can be used to selectively release window frame 217 from fuselage frame 223.

Figure 6:
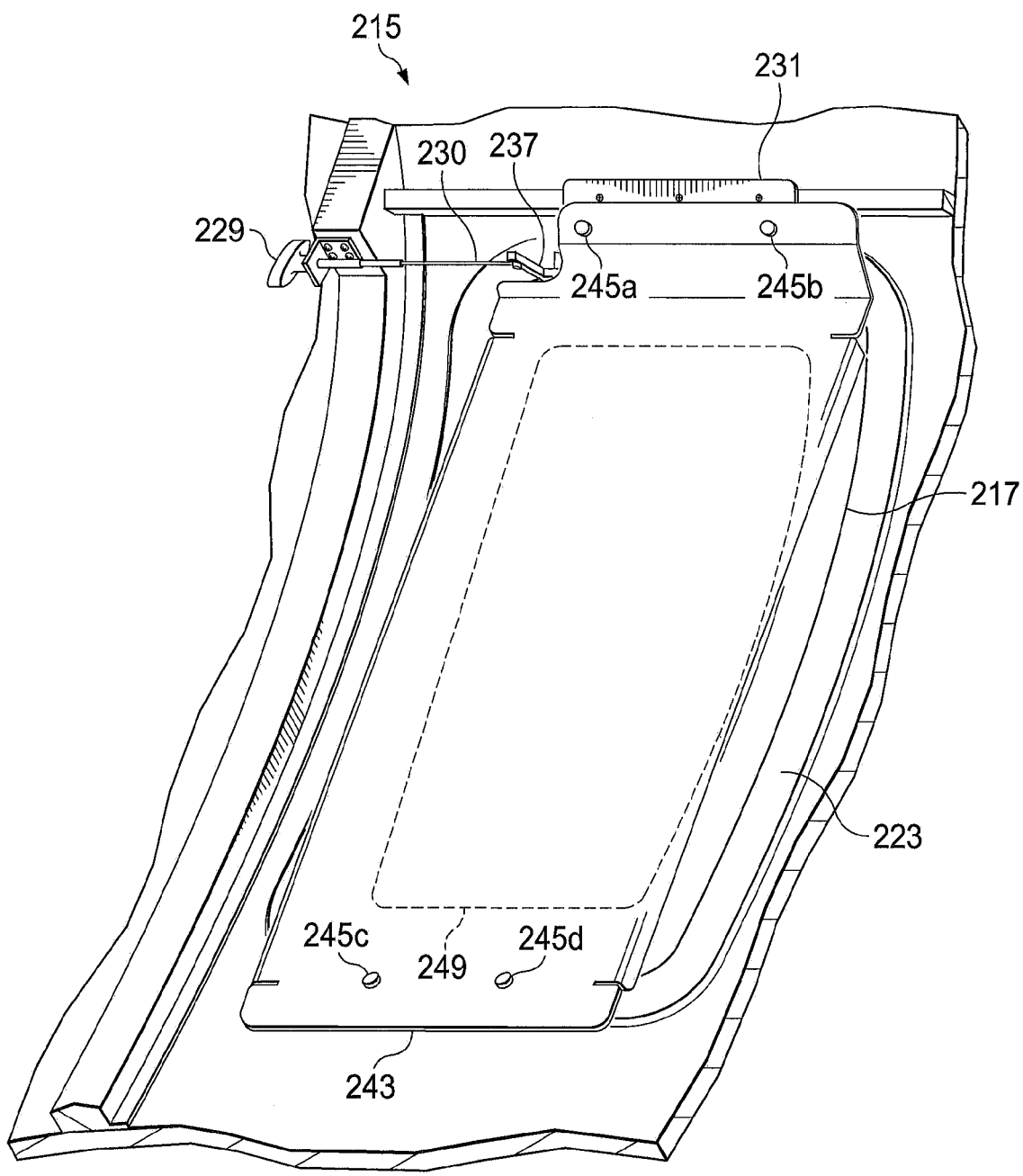
FIG. 6 is a partial interior perspective view of the window mounted raft system, according to the illustrative embodiment of the present application.
Figure 7:
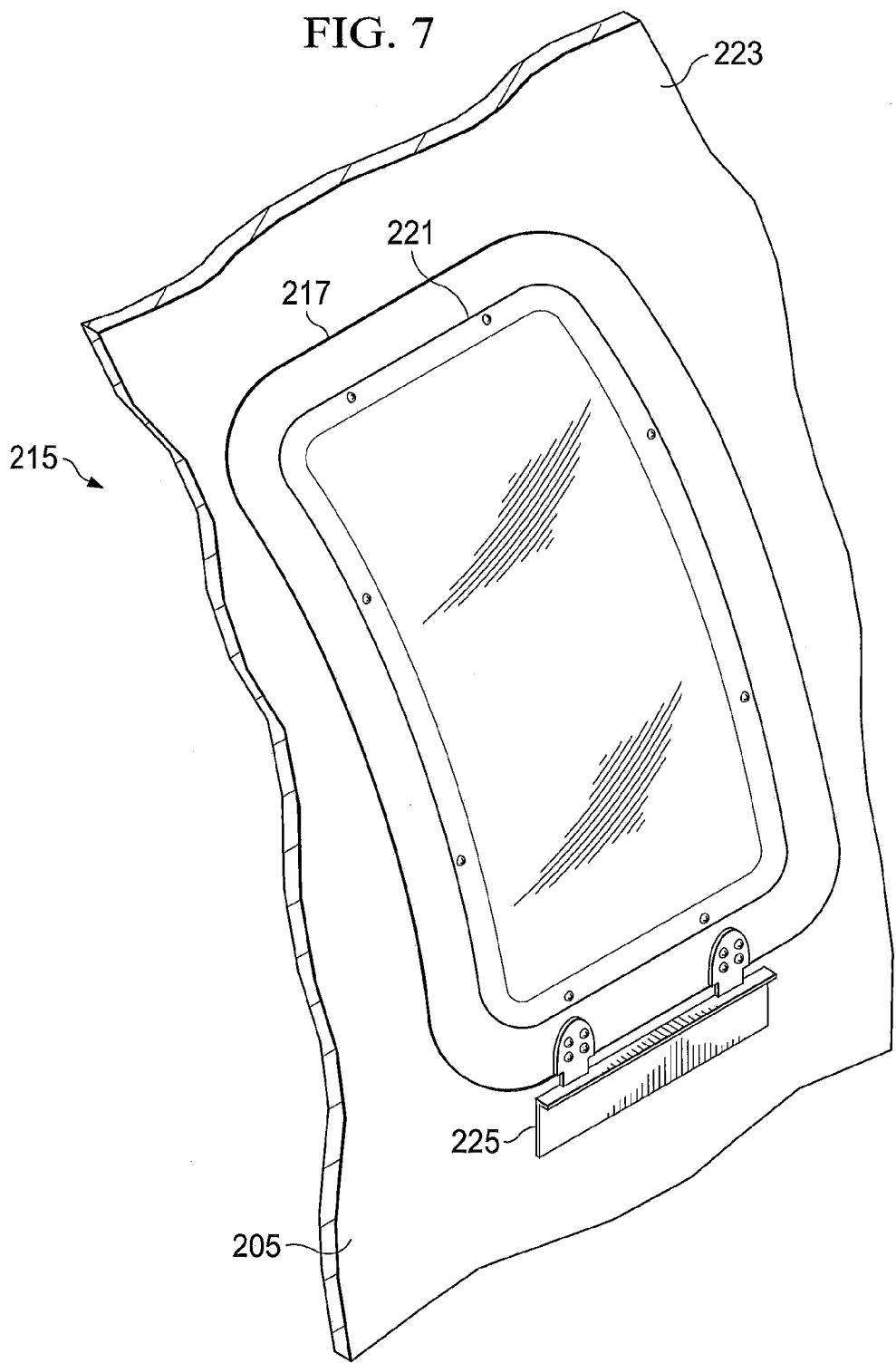
FIG. 7 is an exterior perspective view of the window mounted raft system, according to the illustrative embodiment of the present application.

Referring now also to FIG. 6, an interior perspective view of raft system 215 is illustrated. A backing plate 243 is coupled to adapter 231 and adapter 247 (shown in FIG. 4), via fasteners 245a-245d. Backing plate 243 provides separation between cabin space and inflatable life raft 249, the inflatable life raft 249 being located in the space between the outboard surface of the backing plate 243 and the interior surface of window 221. In the illustrated embodiment, inflatable life raft 249 is primarily secured within the space by the geometry constraints of backing plate 243 and window 221. Backing plate 243 and inflatable life raft 249 can easily be installed or uninstalled, thus providing flexibility of use. Furthermore, fasteners 245a-245d can be a quick pin type fastener that facilitates installation and removal of backing plate 243 and inflatable life raft 249 without tools.

Referring now also to FIGS. 7-10, further illustrations of raft system 215 are shown. Window 221 is illustrated having outwardly bulging contour to accommodate the volume of inflatable life raft 249. It should be appreciated that the curvature of bulged window 249 is implementation specific. For example, if raft system 215 is employed on a rotorcraft configured to carry only two persons, then inflatable life raft 249 may have a smaller volume as compared to an inflatable life raft 249 configured to provide flotation for a six person crew. As such, some embodiments of a bulged type window 221 may have minimal depth of contour. In another embodiment, the space between backing plate 243 and window 221 is sufficient without having to bulge out window 221. Furthermore, the location and geometry of backing plate 243 may also dictate the curvature of window 221.

Figure 11:
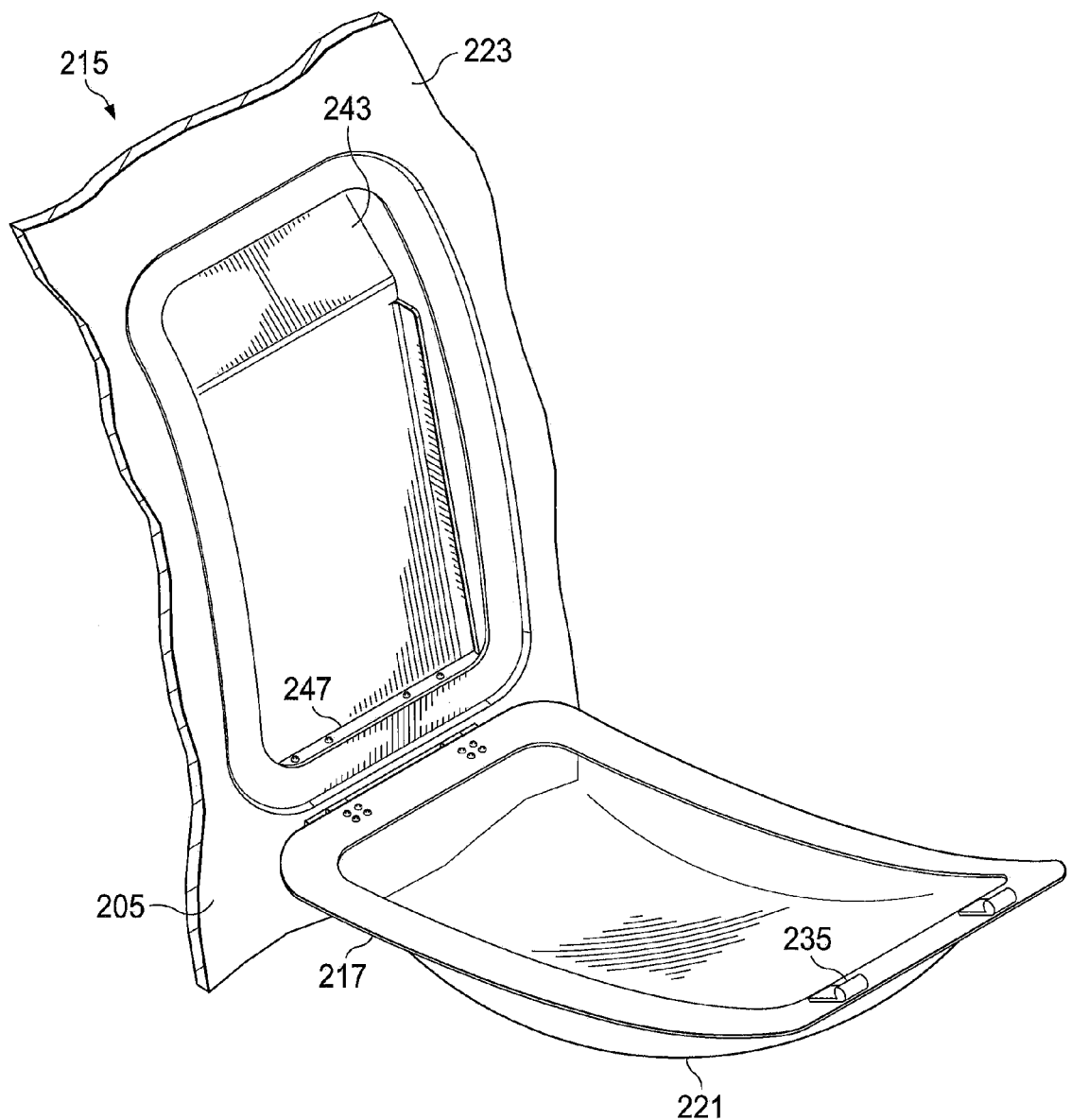
FIG. 11 is a perspective view of the window mounted raft system, according to the illustrative embodiment of the present application.

Referring now also to FIG. 11, an exterior perspective view of raft system 215 is illustrated, with inflatable life raft 249 removed for clarity. Window frame 217 and window 221 are shown partially deployed. As window frame 217 and window 221 are released from rotorcraft 201, inflatable life raft 249 is deployed. Inflatable life raft 249 is preferably tethered to rotorcraft 201 via a mooring line. Inflatable life raft 249 can have an internal compressed air tank for inflation of the inflatable life raft 249. In another embodiment, inflatable life raft 249 is inflated by a compressed air tank carried on rotorcraft 201, the compressed air tank being in fluid communication with inflatable life raft 249 via a plumbing line located with the mooring line. In one embodiment, inflatable life raft 249 is automatically inflatable upon deployment. In another embodiment, the inflation of inflatable life raft 249 is dictated manually. Inflatable life raft 249 preferably includes a survival kit for convenient access of potential occupants of inflatable life raft 249.

Figure 12:
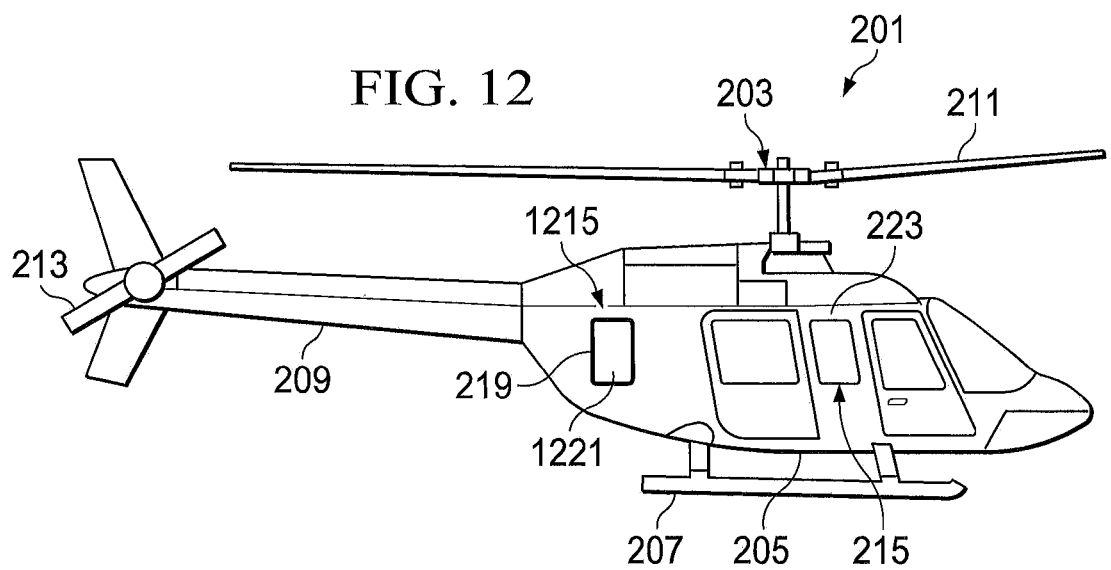
FIG. 12 is a side view of a rotorcraft, according to an alternative embodiment of the present application.

Referring to FIG. 12, rotorcraft 201 is illustrated with a raft system 1215. Raft system 1215 is substantially similar in form and function to raft system 215, except that raft system 1215 is mounted in a fuselage frame 219 that is configured for the mounting of a conventional panel thereto. Raft system 1215 is further distinguished from raft system 215 in that a panel 1221 is used in lieu of window 221. Panel 1221 can be opaque, whereas window 221 is preferably translucent. Notwithstanding the noted distinguishing features of raft system 1215 over raft system 215, the entire discussion herein regarding raft system 215 is equally applicable to raft system 1215. Similar to window 221, panel 1221 can be bulged or non-bulged, depending upon the implementation. It should be appreciated that even though raft system 1215 is illustrated on an aft portion of the pilot's side of rotorcraft 201, raft system 1215 can be located at any practical location on fuselage 205.

Figure 1:
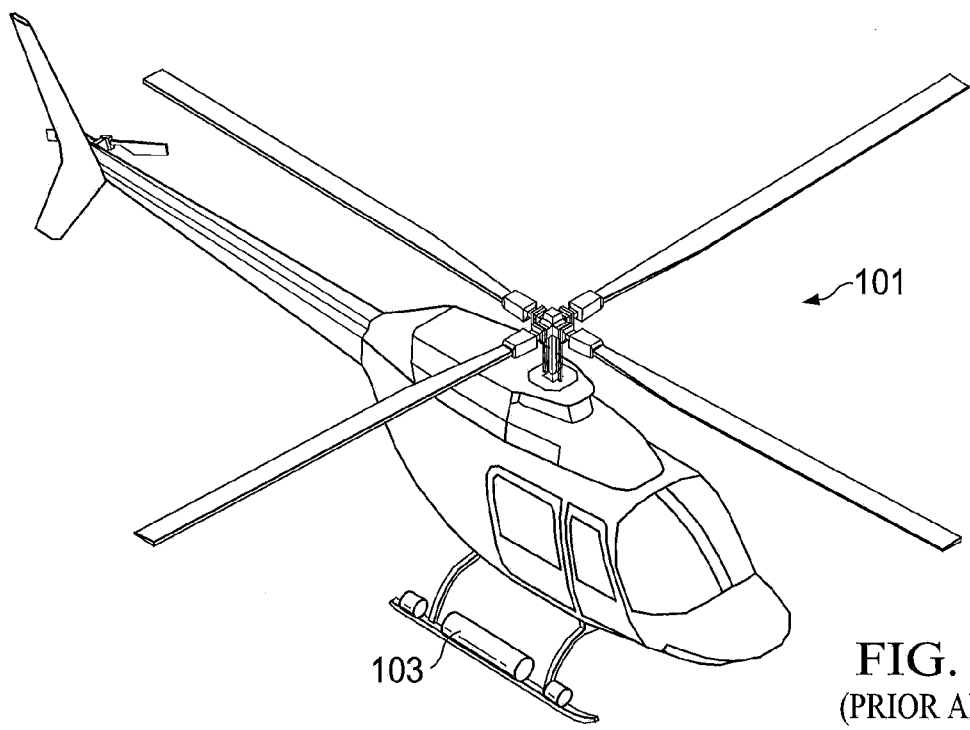
FIG. 1 is a perspective view of a prior art raft/flotation package on an aircraft.

Raft system 215 includes significant advantages over conventional life raft systems. Raft system 215 is located in the window area so that inflatable life raft 249 can be quickly and conveniently be deployed. In the event inflatable life raft 249 is not desired for a flight, such as a flight over land, raft system 215 is configured so that inflatable life raft 249 can easily be removed from the interior of the cabin by first removing backing plate 243, via fasteners 245a-245d. Similarly, the inflatable life raft 249 can easily be installed prior to a flight. Raft system 215 is configured to reduce undesired aerodynamic drag due to the location and configuration of window 221, as compared to raft/flotation package 103 shown in FIG. 1. Further, raft system 215 reduces obstruction that may otherwise occur if the inflatable life raft were located on the landing gear, such as raft/flotation package 103 shown in FIG. 1. Even further, raft system 215 is independent of any other kit installation, which provides greater optimization in selecting inflatable life raft 249 for a flight. If the inflatable life raft were to be jointly located with a flotation bag, such as mid-floatation bag shown in FIG. 1, then the inflatable life raft can't practically be removed at the rotorcraft operator's leisure.

Raft system 215 is also configured to be easily retrofitted onto an existing rotorcraft by removing an existing fixed window and further installing raft system 215. Furthermore, raft system 215 can easily be removed from the rotorcraft and replaced with the original fixed window.

It is apparent that a system with significant advantages has been described and illustrated. Although the system of the present application is shown in a limited number of forms, it is not limited to just these forms, but is amenable to various changes and modifications without departing from the spirit thereof.

What is claimed is:

1. An inflatable life raft system for a rotorcraft having a fuselage, the system comprising:
    a panel;
    a hinge attached to the panel and to the fuselage, wherein the panel is hingedly connected to the fuselage by the hinge, and wherein the panel is selectively removable from the rotorcraft by rotation to a prescribed degree of the panel about the hinge;
    a first adapter coupled to the fuselage;
    a second adapter coupled to the fuselage;
    a mechanism configured for selectively removing the panel from the rotorcraft;
    an inflatable life raft deployable to an exterior of the rotorcraft upon removal of the panel from the rotorcraft; and
    a backing plate removably coupled to both the first adapter and the second adapter, the backing plate located inboard of the panel, the backing plate being located so as to create a stowage space for the inflatable life raft between the backing plate and the panel;
    wherein the backing plate is removable from the fuselage while the panel is closed;
    wherein the hinge is located on an exterior surface of the rotorcraft; and
    wherein the mechanism configured for selectively removing the panel is only accessed from inside the fuselage of the rotorcraft.

2. The inflatable life raft system according to claim 1, further comprising:
    a plurality of tool free fasteners;
    wherein the plurality of tool free fasteners couple the backing plate to both the first adapter and the second adapter.

3. The inflatable life raft system according to claim 2, wherein the panel has an outwardly bulging contour so as to create space for the inflatable life raft.

4. The inflatable life raft system according to claim 1, wherein the mechanism is a pin mechanism for selectively detaching the panel from the fuselage of the rotorcraft.

5. The inflatable life raft system according to claim 4, further comprising:
    a handle operably associated with the pin mechanism, the handle being located so that an occupant of the rotorcraft can actuate the pin mechanism.

6. The inflatable life raft system according to claim 4, the pin mechanism comprising:
    a latch bracket coupled to the fuselage;
    a keeper coupled to the panel; and
    a pin sized for traversal through an opening formed by the latch bracket and the keeper.

7. The inflatable life raft system according to claim 4, wherein the pin mechanism is located near an upper portion of the panel.

8. The inflatable life raft system according to claim 1, further comprising a mooring line coupled to the inflatable life raft.

* * * * *